United States Patent
Xia et al.

(10) Patent No.: US 10,025,494 B2
(45) Date of Patent: Jul. 17, 2018

(54) APPARATUS AND METHOD FOR AN ADAPTIVE EDGE-TO-EDGE DISPLAY SYSTEM FOR MULTI-TOUCH DEVICES

(71) Applicant: Samsung Electronics Co. Ltd., Suwon-si, Gyeonggi-do (KR)

(72) Inventors: Zhiping Xia, Cupertino, CA (US); Howard Z. Lee, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 13/743,029

(22) Filed: Jan. 16, 2013

(65) Prior Publication Data
US 2014/0198057 A1   Jul. 17, 2014

(51) Int. Cl.
*G06F 3/0488* (2013.01)
*G06F 3/041* (2006.01)

(52) U.S. Cl.
CPC ........ *G06F 3/04883* (2013.01); *G06F 3/0416* (2013.01)

(58) Field of Classification Search
CPC .......................... G06F 3/0416; G06F 3/04883
See application file for complete search history.

(56) References Cited

U.S. PATENT DOCUMENTS

| | | | |
|---|---|---|---|
| 2009/0184935 A1 | 7/2009 | Kim | |
| 2010/0085317 A1 | 4/2010 | Park et al. | |
| 2010/0103098 A1 | 4/2010 | Gear et al. | |
| 2010/0171699 A1 | 7/2010 | Wong et al. | |
| 2011/0316807 A1 | 12/2011 | Corrion | |
| 2012/0032979 A1* | 2/2012 | Blow et al. | 345/647 |
| 2012/0038571 A1* | 2/2012 | Susani | 345/173 |
| 2012/0242617 A1 | 9/2012 | Lee | |
| 2013/0285963 A1 | 10/2013 | Park et al. | |

FOREIGN PATENT DOCUMENTS

| | | |
|---|---|---|
| EP | 2 175 344 A2 | 4/2010 |
| KR | 10-2012-0018531 A | 3/2012 |
| KR | 10-2012-0109027 A | 10/2012 |

* cited by examiner

*Primary Examiner* — Viet Pham
(74) *Attorney, Agent, or Firm* — Jefferson IP Law, LLP

(57) ABSTRACT

An apparatus and method for adjusting a display of a portable electronic device having a display unit are provided. The method includes detecting a user's touch of the portable electronic device, determining touch information including at least one of a location and an area of the user's touch on the display unit, determining whether the user's touch is a touch input for executing an operation on the portable electronic device or a user's gripping of the portable electronic device according to the touch information, and adjusting the displaying of a User Interface (UI) according to the user's gripping of the portable electronic device, wherein an entirety of an outward facing surface of the display unit is touch-enabled so as to receive a touch input of a user at any point of the outward facing surface.

13 Claims, 4 Drawing Sheets

APPARATUS AND METHOD FOR AN ADAPTIVE EDGE-TO-EDGE DISPLAY SYSTEM FOR MULTI-TOUCH DEVICES

BACKGROUND OF THE INVENTION

1. Field of the Invention

The present invention relates to an apparatus and method for an adaptive edge-to-edge display system for multi-touch devices. More particularly, the present invention relates to an apparatus and method for detecting touch motion events on a touchscreen of a multi-touch device as well as a hand grip to the touch screen in order to provide an apparatus and method for an adaptive edge-to-edge display system for multi-touch devices.

2. Description of the Related Art

Portable electronic devices, such as mobile and/or laptop Personal Computers (PCs), tablet PCs, mobile terminals, smart phones, Personal Digital Assistants (PDAs), portable media players, and portable electronic devices that may include a touch screen device, such as a multi-touch input screen, and any other suitable and/or similar portable electronic devices, have been developed in order to provide wireless communication between users as well as mobile and/or portable computing. As technology has advanced, portable electronic devices provide a wide variety and increasing number of functions, such as an alarm, a Short Messaging Service (SMS), a Multimedia Message Service (MMS), E-mail, web-browsing, games, graphics editing, text editing, audio/video editing, remote control of short range communication, an image capturing function using a mounted digital camera, a multimedia function for providing audio and video content, a scheduling function, and other similar and suitable functions for a portable electronic device. With the plurality of features now provided, portable electronic devices have become ubiquitous.

Portable electronic devices, such as mobile terminals and tablet PCs, may include touch enabled display screens, such as Liquid Crystal Displays (LCDs), Light Emitting Diode (LED) displays, Organic LEDs (OLEDs), or any other suitable and/or similar display type, that may commonly have a display size ranging from 3 to 12 inches, or any other suitable size. Accordingly, such portable electronic devices may be manufactured to have a fixed screen size according to the display size of the display screen as well as a bezel surrounding the display screen in order to provide a grip area for at least one of a user's hand or gripping tool, henceforth referred to as a user's grip. The bezel provides an area on a front surface of the portable electronic device that may not be sensitive to a user's touch resulting from the user's grip of the portable electronic device.

However, such bezels may occupy up to 30% or more of a total area of the front surface of the portable electronic device, thus reducing an amount of the front surface that may be occupied and used by the touch enabled display screen. Furthermore, as a size of the portable electronic device decreases, such bezels may occupy an even greater amount of the total area of the front surface. Additionally, the portable electronic device may be manufactured to have a fixed bezel size, and thus, may not be well suited for user's having varying hand sizes, such that the bezel is too big for users with relatively small hands and too small for users with relatively big hands. Furthermore, although a motion sensor of the portable electronic device may allow for detection of a device orientation, and other sensors may detect motion, an amount of light, a location, a temperature, and/or other similar characteristics, the portable electronic device of the related art may not detect a user's grip of the portable electronic device. Furthermore, a software platform, such as an Operating System (OS), of the portable electronic device may not be capable of adjusting a display of the display device according to the user's grip of the portable electronic device. Accordingly, there is a need for an adaptive edge-to-edge display system for multi-touch devices.

SUMMARY OF THE INVENTION

Aspects of the present invention are to address at least the above-mentioned problems and/or disadvantages and to provide at least the advantages described below. Accordingly, an aspect of the present invention is to provide an apparatus and method for an adaptive edge-to-edge display system for multi-touch devices.

In accordance with an aspect of the present invention, a method for adjusting a display of a portable electronic device having a display unit is provided. The method includes detecting a user's touch of the portable electronic device, determining touch information including at least one of a location and an area of the user's touch on the display unit, determining whether the user's touch is a touch input for executing an operation on the portable electronic device or a user's gripping of the portable electronic device according to the touch information, and adjusting the displaying of a User Interface (UI) according to the user's gripping of the portable electronic device, wherein an entirety of an outward facing surface of the display unit is touch-enabled so as to receive a touch input of a user at any point of the outward facing surface.

In accordance with another aspect of the present invention, a portable electronic device having an adjustable User Interface (UI) is provided. The apparatus includes a controller for determining adjustments to the adjustable UI, a display unit for displaying the adjustable UI according to the control of the controller, the display unit occupying an entirety of a front face of the portable electronic device, a storage unit for storing information related to the adjusting of the adjustable UI, a sensor unit for sensing touch information for a user's touch to the display unit, and a hand-grip detection unit for determining whether the user's touch to the display unit is a user's grip for gripping the portable electronic device and for generating hand-grip information according to the user's grip.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for an adaptive edge-to-edge display system for multi-touch devices.

Figure 1:
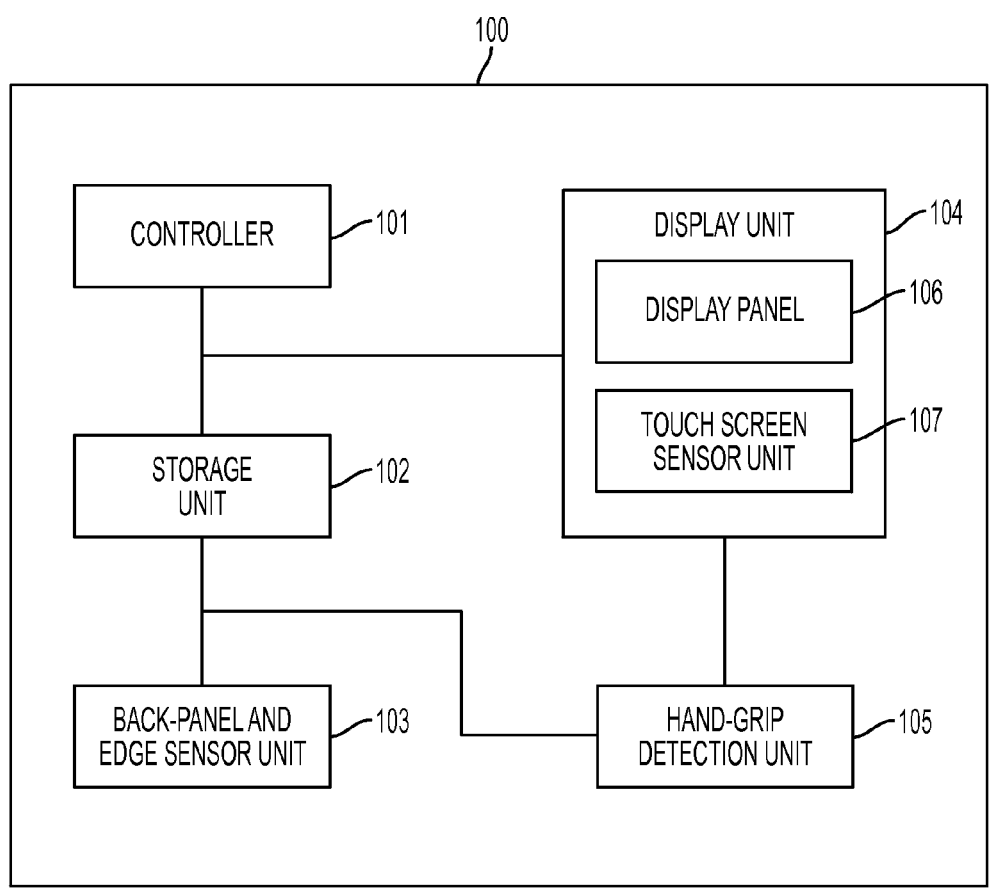
FIG. 1 is a portable electronic device according to an exemplary embodiment of the present invention.

FIG. 1 is a portable electronic device according to an exemplary embodiment of the present invention.

Referring to FIG. 1, the portable electronic device 100 may be a mobile terminal, a Portable Computer (PC), a tablet PC, a portable media player, or any other similar portable electronic device that includes a display unit 104 including a display panel 106 for displaying images and a touch screen sensor unit 107 capable of receiving a touch input. The portable electronic device 100 may include a controller 101, a storage unit 102, a back-panel and edge sensor unit 103, the display unit 104, and a hand-grip detection unit 105. Herein, the back-panel and edge sensor unit 103 and the touch screen sensor unit 107 may be collectively referred to as sensor units 103 and 107.

The controller 101 may control overall operations of the portable electronic device 100, as well as the constituent elements included in the portable electronic device 100. Furthermore, at least one of the controller 101 and the storage unit 102 may include a touch screen driver capable of touch screen hardware control, a back-panel touch driver capable of touch enabled back-panel hardware control, a hand-grip controller capable of receiving signals from the touch screen driver and the back-panel touch driver, and a User Interface (UI) engine capable of generating, updating, modifying and rendering an Operating System (OS) UI and an application UI according to a user's hand grip, and any other similar and/or suitable elements for controlling overall operations or other functions and operations of the portable electronic device 100.

The storage unit 102 may store programs required for overall operations of the portable electronic device 100, including any of the information and/or the algorithms discussed herein as being received, transmitted, retained or used by the portable electronic device 100 and the constituent elements of the portable electronic device 100. The sensor units 103 and 107 may detect a user input, such as a touch input executed using a user's hand or a touch input device, on a surface, such as a front surface, of the portable electronic device 100. Additionally, the sensor units 103 and 107 may detect a user's hand grip or a gripping tool that grips the portable electronic device 100. However, the present invention is not limited thereto, and the sensor units 103 and 107 may detect a touch input and a user's grip of the portable electronic device 100 on a rear surface or any other surface of the portable electronic device 100. The sensor units 103 and 107 may be touch screen devices and/or touch sensing devices that sense a user's touch to the front surface and/or the back surface of the portable electronic device 100. For example, the sensor units 103 and 107 may be capacitance type touch screen devices that sense and/or detect the user's touch according to a variance in capacitance of the touch screen device. However, the present invention is not limited thereto, and the sensor units 103 and 107 may be any suitable sensor for detecting a user's touch to a surface of the portable electronic device 100.

The display unit 104 may display a variety of information for a user of the portable electronic device 100, including information pertaining to operations, programs, and functions executed by the portable electronic device 100. According to an exemplary embodiment of the present invention, the display unit 104 does not include a bezel or have a bezel surrounding the display unit 104. In other words, the display unit 104 may encompass an entirety of a front surface of the portable electronic device 100 so as to provide a usable display surface across the entirety of the front surface of the portable electronic device 100, wherein the entirety of the usable display surface may be touch-enabled so as to receive a user's touch input. Thus, the display unit 104 may have an edge that is orthogonal to the front surface. Although the display unit 104 is illustrated as one unit including the display panel 106 and the touch screen sensor unit 107, exemplary embodiments of the present invention are not limited thereto, and the display unit 104, the display panel 106 and the touch screen sensor unit 107 may be configured as separate units, or may be configured in any other suitable and/or similar manner.

The hand-grip detection unit 105 may determine whether a user's touch to the portable electronic device is a touch input or a gripping of the portable electronic device 100. In other words, the hand-grip detection unit 105 may distinguish between a user's grip of the portable electronic device 100 and a touch input to a surface of the portable electronic device 100. Furthermore, the hand-grip detection unit 105 may determine a location of the user's grip on the portable electronic device 100 and may also determine an area of the display unit 104 that may be at least one of obstructed, not viewable, blocked, and not usable due to the user's grip. Furthermore, the hand-grip detection unit 105 may determine an area of the display unit 104 that is proximate to the location of the user's grip on the portable electronic device 100.

The hand-grip detection unit 105 may generate hand-grip location information indicating the location of the user's grip and transmit the hand-grip location information to the controller 101. The hand grip location information may be determined according to sensor data generated by the sensor units 103 and 107. More specifically, sensor data corresponding to a location of a user's hand on an edge and/or back surface of the portable electronic device 100 may be provided by the back-panel and edge sensor unit 107 to the hand-grip detection unit 105. Additionally, sensor data corresponding to a location of a user's hand on a front surface of the portable electronic device 100 may be provided by the touch screen sensor unit 107 to the hand-grip detection unit 105. For example, in a case where the sensor units 103 and 107 are capacitance type touch screen units, the sensor units 103 and 107. For example, in a case where the sensor unit 103 is a capacitance type touch screen unit, the sensor unit 103 may detect a change in capacitance at a location where the user touches the portable electronic device 100. The sensor units 103 and 107 may then generate touch location information corresponding to the location of the detected change in capacitance.

Additionally, the sensor units 103 and 107 may provide real-time data for the sensor data corresponding to a current location of a user's hand or hands gripping the portable electronic device 100 so that movement of the user's hand or hands is detected by the sensor units 103 and 107 and corresponding sensor data for the current location of a user's hand or hands may be provided to the hand-grip detection unit 105. Accordingly, the hand-grip detection unit 105 may detect a change in position and/or type of a user's grip, i.e., a change in a location of the user's hand or hands gripping the portable electronic device 100 and/or a change the number of hands gripping the portable electronic device 100. Upon detection of the change in the position and/or type of the user's grip, the hand-grip detection unit 105 may generate a notification of the change and may provide to change notification to the controller 101.

The touch location information may be provided to the hand-grip detection unit 105, which may determine whether the touch corresponding to the touch location information is a user input to the portable electronic device 100 or a user's grip of the portable electronic device 100. Additionally, the hand-grip detection unit 105 may determine the location of the user's grip according to the touch location information, and may also determine a size, an area, and other similar characteristics of the user's grip of the portable electronic device 100. The hand-grip detection unit 105 may then generate the hand-grip location information that may indicate at least one of a location, size and area of the user's hand grip and provide the hand-grip location information to the controller 101. Additionally, the hand-grip location information may be stored on the storage unit 102.

The hand-grip detection unit 105 may determine that a detected touch is a user's grip of the portable electronic device rather than a user input according to characteristics of the detected touch. For example, the hand-grip detection unit 105 may determine that the detected touch is the user's grip according to any one of an amount of time the detected touch is detected, a location of the detected touch, a shape of the detected touch, an area of the portable terminal 100 occupied by the detected touch, an amount of pressure exerted by the user for the detected touch, and/or any other similar and or suitable characteristics of the detected touch.

The controller 101 may receive the hand-grip location information and determine whether the user's grip of the portable electronic device 100 may affect the user's view of the display unit 104 and/or the user's use of the portable electronic device 100 due to the location of the user's grip of the portable electronic device 100. In other words, the controller 101 may determine whether the user's grip interferes with and/or overlaps with content that is displayed on the display unit 104. In such a case, the controller 101 may adjust displaying of the content on the display unit 104 so that the user's grip does not interfere with and/or overlap with the displayed content. Accordingly, the controller 101 may control the display unit 104 so as to warp, bend, shift, rotate, relocate, zoom-in, zoom-out, or perform any suitable adjustment of the displayed content so that the displayed content is viewable and/or usable by the user gripping the portable electronic device 100.

Figure 2A:
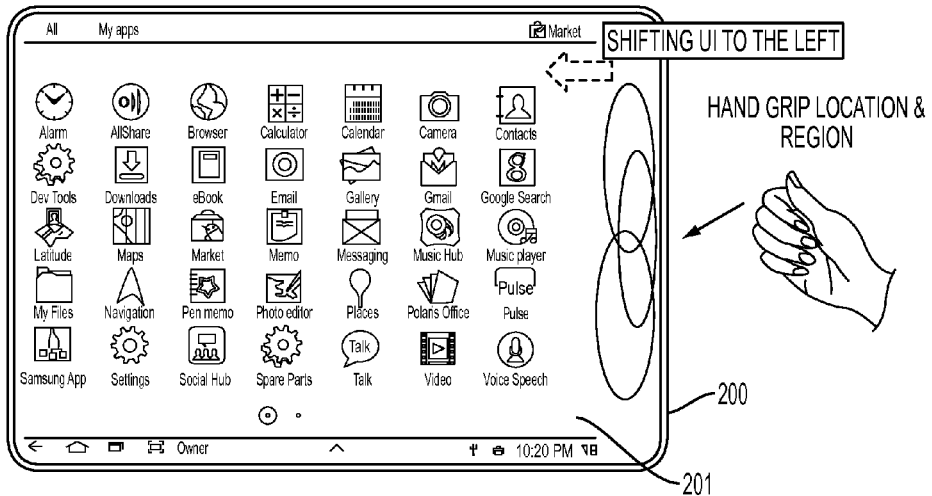
FIGS. 2A-2C illustrate adjusting of a displayed image of a portable electronic device according to an exemplary embodiment of the present invention.
Figure 2B:
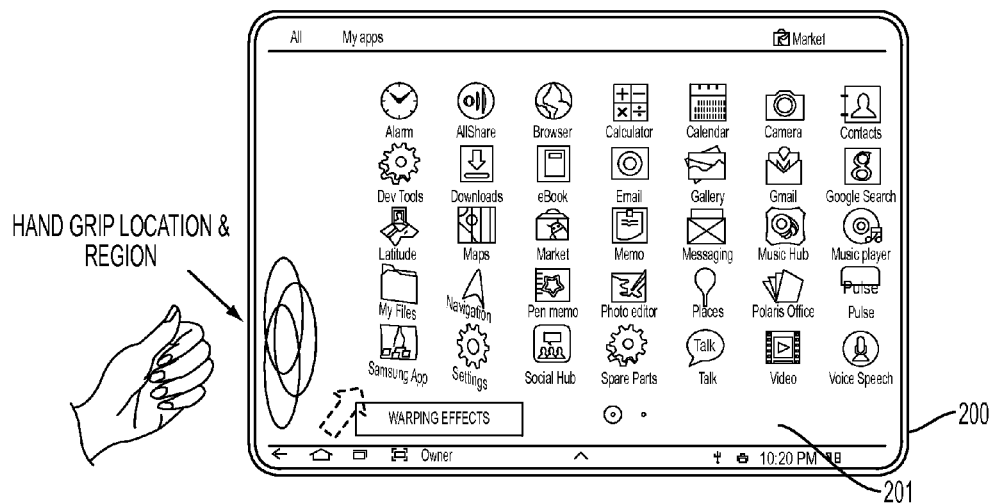
Figure 2C:
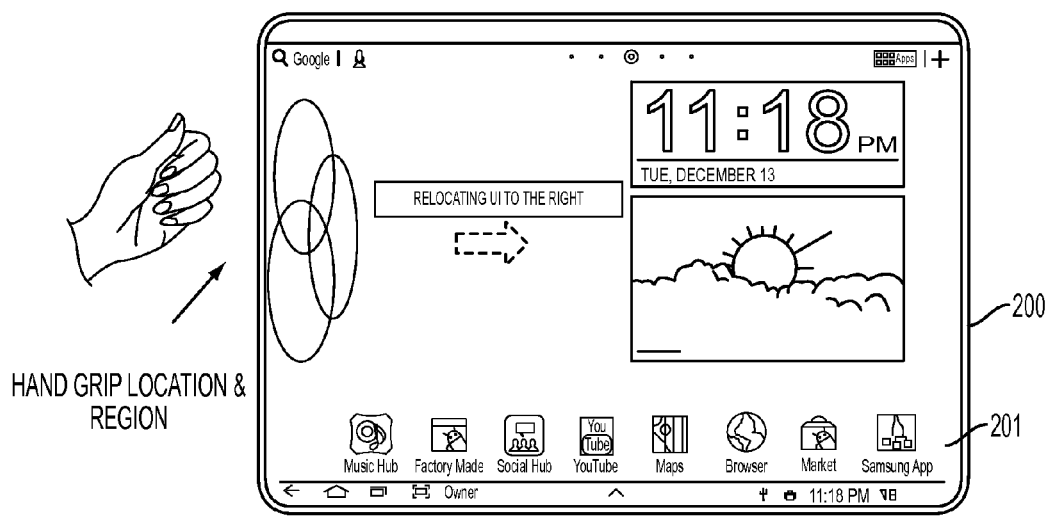

FIGS. 2A-2C illustrate adjusting of a displayed image of a portable electronic device according to an exemplary embodiment of the present invention.

Referring to FIGS. 2A-2C, a portable electronic device 100 may display a User Interface (UI) 201 according to a control of the controller 101. As shown in FIG. 2A, a user's hand may grip a side area of the portable electronic device 100. In such a case, the controller 101 may control the display unit 104 to display the UI 201 such that it does not overlap with the user's hand that is gripping the side area of the portable electronic device 100. As shown in FIG. 2A, an entirety of the UI 201 may be shifted to the left so that the user's hand does not cover up or overlap with icons displayed at a right side of the UI 201. As such, according to the user's grip of the portable electronic device 100, the controller 101 may adjust a display of the UI 201 on the display unit 104 so that the all of the UI 201 is viewable and usable when the user's hand grips the portable electronic device 100 that includes the display unit 104 that is entirely touch-enabled. However, exemplary embodiments of the present invention are not limited thereto, and the display of the UI 201 and/or the displaying of any image on the display unit 104 may be adjusted in any manner suitable upon a user's gripping of the portable electronic device 100.

Referring to FIG. 2B, according to an exemplary embodiment, the controller 101 may control the display unit 104 to display the UI 201 in a warped manner such that only an area of the UI 201 that is proximate to the user's hand gripping the portable electronic device 100 is adjusted. More specifically, the hand-grip detection unit 105 may determine a location and/or an area of the user's hand gripping the portable electronic device 100 and convey the location to the controller 101. The controller 101 may determine an area of the UI 201 that is covered up or blocked by the user's hand and may control the display unit 104 so that an area of the UI 201 corresponding to the location and/or area of the user's hand is warped. Accordingly, an entirety of the UI 201 may be viewable and usable to the user while the user's hand grips a portion of the display unit 104 that is entirely touch-enabled.

Referring to FIG. 2C, according to an exemplary embodiment, the controller 101 may control the display unit 104 to display the UI 201 in a rearranged manner such that only items, icons, elements, or objects of the UI 201 that are proximate to the user's hand gripping the portable electronic device 100 are moved. More specifically, the hand-grip detection unit 105 may determine the location and/or the area of the user's hand gripping the portable electronic device 100 and convey the location to the controller 101. The controller 101 may determine the area of the UI 201 that is covered up or blocked by the user's hand and may control the display unit 104 so that items displayed in that area of the UI 201 are moved and/or rearranged to another area of the UI 201 that is not proximate to the user's hand. Accordingly, an entirety of the UI 201 may be viewable and usable to the user while the user's hand grips a portion of the display unit 104 that is entirely touch-enabled.

Figure 3:
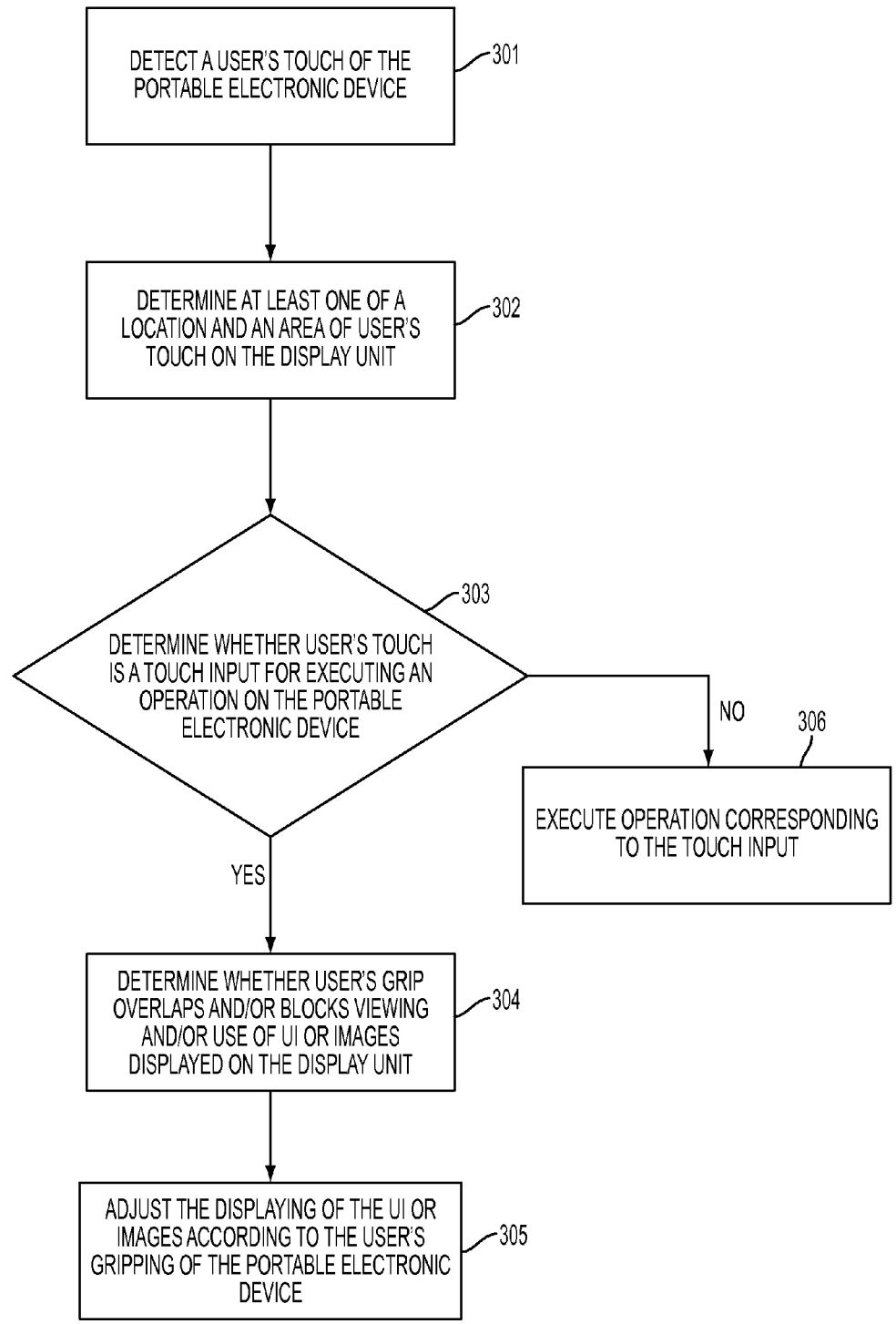
FIG. 3 illustrates a method for adjusting a display of a portable electronic device according to exemplary embodiments of the present invention.

FIG. 3 illustrates a method for adjusting a display of a portable electronic device according to exemplary embodiments of the present invention.

Referring to FIG. 3, the sensor units 103 and 107 may detect a user's touch of the portable electronic device 100 in step 301. Next, in step 302, the sensor units 103 and 107 determine at least one of a location and an area of the user's touch on the display unit 104. In step 303, the hand-grip detection unit 105 determines whether the user's touch is a touch input for executing an operation on the portable electronic device 100 or a gripping of the portable electronic device 100. If it is determined that the user's touch is a gripping of the portable electronic device 100, then, in step 304, it is determined whether the user's grip overlaps and/or blocks viewing and/or use of UI or images displayed on the display unit 104. If it is determined that the user's gripping of the portable electronic device 100 overlaps and/or blocks viewing and/or use of UI or images displayed, then, in step 305, the displaying of the UI or images is adjusted according to the user's gripping of the portable electronic device 100 such that an entirety of the UI is viewable and usable by the user. However, at step 303, if it is determined that the user's touch is the touch input, then, at step 306, an operation corresponding to the touch input may be executed.

Certain aspects of the present invention may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), Compact Disc (CD)-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for adjusting a display of a portable electronic device having a display, the method comprising:
    detecting a user's touch of the portable electronic device;
    determining touch information including at least one of a location and an area of the user's touch on the display;
    determining whether the user's touch is a touch input for executing an operation on the portable electronic device or a user's gripping of the portable electronic device according to the touch information; and
    adjusting the displaying of a User Interface (UI) according to the user's gripping of the portable electronic device by warping only an area of the UI corresponding to a location of the user's grip of the portable electronic device so as to move only elements of the UI included in the area of the UI corresponding to the location of the user's gripping of the portable electronic device,
    wherein, the warping alters a shape of at least one element of the UI previously displayed in the area of the UI corresponding to a location of the user's grip such that the at least one element is displayed warped, and moved to an area proximate to the location of the user's grip,
    wherein, when adjusting the displaying of the UI, an entirety of an outward facing surface of the display is touch-enabled so as to receive a touch input of a user at any point of the outward facing surface of the UI and operate the UI, and
    wherein, if the user's touch is the user's gripping of the portable electronic device, detecting a change in at least one of position and type of the user's grip and generating a notification of the change.

2. The method of claim 1, further comprising determining, if the user's touch is the gripping of the portable electronic device, whether the user's grip is at least one of overlapping a displaying of the UI on the display and blocking use of the UI,
    wherein the adjusting of the displaying of the UI is executed if it is determined that the user's gripping of the portable electronic is at least one of overlapping the displaying of the UI and blocking use of the UI.

3. The method of claim 1, wherein the adjusting of the displaying of the UI includes shifting an entirety of the UI so as to not overlap the UI with the user's grip of the portable electronic device.

4. The method of claim 1, wherein the adjusting of the displaying of the UI includes shifting items displayed in the UI that are located at a location of the user's grip of the portable electronic device so as to not overlap with the user's grip of the portable electronic device.

5. The method of claim 1, wherein the determining of whether the user's touch is the touch input for executing an operation on the portable electronic device or the user's gripping of the portable electronic device according to the touch information comprises:
    determining hand-grip information according to the touch information,
    wherein the hand-grip information includes at least one of a location of the user's grip of the portable electronic device, an area of the user's grip of the portable electronic device, and a duration of the user's grip of the portable electronic device.

6. A portable electronic device having an adjustable User Interface (UI), the portable electronic device comprising:
    at least one processor configured to determine adjustments to the adjustable UI;
    a display configured to display the adjustable UI according to the control of the at least one processor by warping only an area of the UI corresponding to a location of a user's grip of the portable electronic device so as to move only elements of the UI included in the area of the UI corresponding to the location of the user's gripping of the portable electronic device, the display occupying an entirety of a front face of the portable electronic device;
    a memory configured to store information related to the adjusting of the adjustable UI;
    a sensor configured to sense touch information for a user's touch to the display; and
    a hand-grip detector configured to:
        determine whether the user's touch to the display is the user's grip for gripping the portable electronic device, and generate hand-grip information according to the user's grip,
detect a change in at least one of position and type of the user's grip, and
notify the at least one processor of the change,
wherein the display is further configured to display the UI such that an entirety of an outward facing surface of the display is touch-enabled so as to receive a touch input of a user at any point of the outward facing surface of the UI and operate the UI, and
wherein, the warping alters a shape of at least one element of the UI previously displayed in the area of the UI corresponding to a location of the user's grip such that the at least one element is displayed warped, and moved to an area proximate to the location of the user's grip.

7. The portable electronic device of claim 6, wherein the touch information includes at least one of a location of the user's touch and an area of the user's touch.

8. The portable electronic device of claim 6, wherein the hand-grip information comprises at least one of a location of the user's grip of the portable electronic device, an area of the user's grip of the portable electronic device, and a duration of the user's grip of the portable electronic device.

9. The portable electronic device of claim 6, wherein the at least one processor is configured to control the display to shift an entirety of the UI so as to not overlap the UI with the user's grip of the portable electronic device.

10. The portable electronic device of claim 6, wherein the at least one processor is configured to control the display to shift items displayed in the UI that are located at a location of the user's grip of the portable electronic device so as to not overlap with the user's grip of the portable electronic device.

11. The portable electronic device of claim 6, wherein the at least one processor is configured to control operations of the display, the memory, the sensor, and the hand-grip detector, and
wherein the at least one processor is configured to determine adjustments to the adjustable UI according to the hand-grip information.

12. The portable electronic device of claim 6, wherein the sensor is a touch screen device configured to sense a user's touch to the display unit, and
wherein the touch screen device is disposed on the display.

13. The portable electronic device of claim 6, wherein the memory stores the touch information and the hand-grip information.

* * * * *